United States Patent Office 3,523,823
Patented Aug. 11, 1970

3,523,823

ELECTROLESS PLATING WITH LOW CONTROLLED COERCIVITY

John H. Kefalas, North Billerica, Mass., assignor to Honeywell Inc., Minneapolis, Minn., a corporation of Delaware No Drawing. Continuation-in-part of application Ser. No. 582,090, Sept. 26, 1966. This application Oct. 20, 1967, Ser. No. 676,734
Int. Cl. H01f *10/02*; C23c *3/02*
U.S. Cl. 117—238 9 Claims

ABSTRACT OF THE DISCLOSURE

A "soft" magnetic memory film of the nickel-cobalt type electroless plated onto a ceramic substrate, thickness being kept below about two microns and coercivity below about 10 oe. The film may be plated to have an unusually pronounced anisotropy (large remanent flux $B_r$ in Easy direction; small $B_r$ in Hard direction) and an extremely high $H_c/H_k$ ratio (1.0 being the practical max.), on the order of as high as 0.9. Electroless plating methods and associated electrolyte for plating such films are also discussed and involve rather basic electrolytes having an unusually low concentration of cobalt/nickel relative to "hypo" concentration (such as about 1:1.5 at pH 8.0), as well as high concentrations of ammonium chloride and citric acid.

This application is a continuation-in-part of my copending application Ser. No. 582,090, filed Sept. 26, 1966, and now abandoned.

BACKGROUND PROBLEMS—INVENTION FEATURES

In the art of plating nickel-cobalt type magnetic films, such as electrolessly from a "Brenner" type electrolyte, containing salts of the deposit metals and a hypophosphite reducing agent, no practical means has yet been found for deriving a good "soft" film (i.e. having low coercivity $H_c$, e.g. below about 10 oe. Such soft films have been practically derived, heretofore, only by vacuum deposition and the like and not by electroless plating. The invention teaches a practical method of electroless plating such films, something workers in the art will readily adopt with great advantage. For instance, it will enable the deposition of a number of different coatings along one continuous plating line; whereas heretofore such was not possible, e.g. for depositing insulator coatings, drive windings, etc. in company with such a soft film, a plating line would have to be interrupted to vacuum-deposit this film.

In electroless plating such soft films, it is important to provide better control over film anisotropy and, if possible, to make this anisotropy (squareness change from Hard to Easy switching direction), as pronounced as possible. Squareness may be loosely defined (as by those skilled in the art) by the ratio of remanent flux to saturation flux $B_rB_s$ in a particular switching direction (i.e. "Hard axis" or "Easy axis"). The Hard-to-Easy change in squareness associated with film anisotropy (the bigger this change, the more "pronounced" is the anisotropy) is generally associated in turn, with a low "Hard remanence" ($B_r$ in the Hard switching direction) as well as a high "Easy remanence" (this resulting in a large change in $B_r$ when switching Easy to Hard). A pronounced anisotropy is, in turn, a sign of a desirably low "skew" and suggests a rotation-switching, rather than (the slower) domain wall-motion phenomenon (with a sufficiently "square loop" hysterigram). Of course, squareness ($B_r/B_s$) is typically high in the Easy direction (e.g. about 0.95 to almost 1), while being rather low in the Hard direction (e.g. conventionally not lower than about 0.2–0.3 in cases like these). However, according to this invention, such "Hard remanence" ($B_r$) is reduced; hence "Hard squareness" is reduced (to the order of below about 0.1) and anisotropy is better controlled and more pronounced as a result ("Easy squareness" being kept high). Workers will recognize that this makes a film more valuable as a magnetic memory storage element (switching efficiency improved, etc.).

The present invention answers this need by providing techniques for electroless plating such magnetic nickel-cobalt type memory films of low coercivity and controlled anisotropy characteristics in a very convenient manner. More specifically, the invention teaches a method of electroless-plating this kind of film to have a coercivity controllable in values from about 0.5 to about 10 oe. and to exhibit an extremely pronounced anisotropy. Such methods additionally can advantageously provide a very high $H_c/H_k$ ratio on the order of about 0.9 (vs. a conventional 0.3 ratio value for such films). Workers in the art will recognize that this is a distinctive achievement, one having great value for the plating of thin magnetic films for memory, etc.

Workers in the art have from time to time recognized that it is advantageous to plate thin magnetic films onto a ceramic substrate (e.g. a glass plate); though it is notoriously difficult to do this, especially with conventional electroless planting techniques. Nonetheless, using electroless plating methods according to the invention, I have found that one can satisfactorily plate such films to a smooth glass substrate. Moreover, I have found that this produces some unexpected advantages; for instance, whereby such glass substrates have such a superior "roughness-uniformity" and, as a result, exhibit such superior magnetic properties as aforementioned (e.g. low $H_c$, sharp anisotropy, etc.). Such ceramic substrates are also advantageous over typical metal substrate in that they are less likely to include structural impurities which induce "plating holes" and the like. The invention also makes it practical to electroless plate copper onto a non-metal, e.g. such as to follow the substrate surface configuration (for thin copper layers) and to provide a copper-substrate for deposition (e.g. plating after surface-treating the copper). Such a copper plating may advantageously provide a "ground plane" for thin film memory elements (to confine fields applied thereto).

In the course of evolving the electroless plating techniques of the invention, I have found that, in accordance with one aspect of this invention, it is important to maintain a low concentration of nickel and cobalt relative to phosphorus (in the alloy), the pH value being somewhat dependent upon this concentration-ratio, It was surprising that such a concentration ratio should be able to electroless-plate a "low $H_c$" film; especially since some workers in the art believe that a "hard" material (e.g. $H_c$ over about 50 oe.) should be expected in such a case; while others even believe that the resultant film will be non-magnetic.

In accordance with another aspect of this invention, a method is followed for electroless plating a Ni-Co type magnetic memory film optimum magnetic properties. A prescribed metal or non-metal substrate is immersed for such plating in a modified "Brenner type" electrolyte, characterized by an unusually low concentration of nickel and cobalt source ions relative to "hypo" concentration (e.g. on the order of 1:3; vs. a conventional 2(+):1). According to a related feature this electrolyte is preferably also prepared to include especially high concentrations of citric acid and ammonium chloride.

Another surprising, novel feature of the present electroless plating method is that, using the plating methods of the invention, together with a substrate having high roughness-uniformity (as aforementioned), to plate a "soft" magnetic film, one is able to induce an intrinsic anisotropy along a selectable direction simply according to how the plating substrate is oriented in the electrolyte. More particularly it has been found that orienting the substrate in prescribed relation with "plumb" (gravitational field direction—e.g. at about a 30° skew with "plumb"), the resulting electroless-plated film may be controlled to have all magnetic moments aligned along a prescribed (selectable) "Easy" axis. Although a complete explanation for this effect is lacking as yet, it is theorized that it may be caused by terrestrial flux, or perhaps (less likely) by the direction of "hydrogen bubbling". In any event, this effect has evidently passed unnoticed heretofore perhaps because it would typically be "masked-out" by other (more dominant) effects except at an unusually low coercivity. Workers in the art will recognize many impressive advantages flowing from this feature, such as a new, convenient anisotropy control. For instance, anisotropy can by this technique, be made uniform over a very, very large film area, virtually as large as you please and unlike anything known at present, there being no "fringing field effects" or the like, as are associated with conventional anisotropy control (e.g. from locally-generated magnetic fields). Of course, conventional (artificial) "directing fields" may also be applied in company with this technique for modifying resultant anisotropy in a film.

The foregoing characteristics of thin magnetic films are well known in the art and will not be dwelt upon; however, most of them are clearly and more completely discussed in U.S. Pat. No. 3,234,525 to Wolf to which reerence should be made, for instance, for further explanation of such terms as "Easy" (and "Hard") axis of magnetization, "Squareness" (of hysterigram) high saturation induction $B_s$, and relative values of "normal" coercive force $H_c$ (especially $H_{co}$ where $B_s$ begins to fall, analogous to switching field intensity) to $H_k$ (i.e. "hard permability" or saturation coercive force along "hard axis"—found by extrapolating hard B-H curve to intersect "Easy $B_s$" level).

Thus, it is a general object of the invention to provide an electroless-plated magnetic film of the nickel-cobalt type having a very low coercivity in the order of a few oersteds or less and a new technique for providing such. Another object is to plate such a film having a very sharp anisotropy change, especially for a film with an anisotropic axis with a square-loop hysteresis characteristic. A related object is to plate such a film to have a very high $H_c/H_k$ ratio. Still another object is to plate such a film to a substrate (especially a ceramic like glass) having high roughness-uniformity. Still another object is to so plate such films as to also induce an intrinsic anisotropy simply according to substrate orientation in the electrolyte with respect to "plump." Another object is to so plate using high concentrations of ammonium chloride and citric acid. A related object is to so plate, keeping the cobalt and nickel concentration low relative to phosphorus concentration and/or relative to "hypo" concentration. Other objects and features of advantages will occur to those skilled in the art especially upon consideration of the following description of the representative embodiments illustrating the fabrication and application of the invention.

One exemplary such embodiment may be characterized generally as a magnetic nickel-cobalt-phosphorus film about 0.75 micron thick with a coercivity ($H_c$) of about 4, an "anistropy" field ($H_k$) of about 5 ($H_k$) being understood as the "Hard-direction" field required to rotate the magnetization vector from the Easy to the Hard direction), plus a relatively constant saturation flux about 14 kg. (in each direction, Hard and Easy) and a surprisingly low "Hard remanence" ($R_h$ about 0.1 $B_s$) together with normally-high "Easy remanence" ($R_E$ about 0.95 $B_s$). Such a film is electroless plated by depending a glass substrate in the Brenner type (Ni-Co) electrolyte so that its deposition surface is skewed at about 30° with respect to "plumb," while keeping pH at about 8.0 and nickel-cobalt/hypo concentration ratio at about 1:3. Preferably, the roughness of the (ceramic) substrate should be 40 micro-in. and the electrolyte include about 40 to 45 g./l. citric acid and about 40 g./l. ammonium chloride, the balance being similar to a standard "Brenner" bath with the electroless plating methods being otherwise conventional. (By comparison the method in the preferred example below is similar, except that $H_c$ is about 2.5 and $H_k$ about 4.5 oe.)

By way of example, I will now discuss my invention in light of a specific technique for electroless plating a nickel-cobalt-phosphorus magnetic memory film on a ceramic substrate to have properties such as indicated below in Table I. In order to supplement this disclosure and clarify understanding of the general type electroless plating methods contemplated here, the disclosure of the aforementioned application Ser. No. 582,090 is to be incorporated by reference herein (except to the extent that the present disclosure modifies it), adapting it to the instant particular purposes. However, it will be understood that the examples below do not in themselves limit the invention to the precise stated conditions, ingredients, applications etc., but rather indicate propaedeutic embodiments enabling those skilled in the art to practice the best mode of the invention as defined within the scope of the appended claims, as well as suggesting suitable equivalent materials, steps and applications.

EXAMPLES

A thin nickel-cobalt-phosphorus magnetic film is electroless plated to a thickness of about 0.75 micron on to a relatively smooth, flat glass substrate using the following preferred electrolyte and plating conditions, especially arranged to derive a film coercivity ($H_c$) of about 2.5 oe. (alternate examples being indicated by the ranges disclosed):

BATH A (PREFERRED)

| | Optimum (gm./l.) | Others—Range (gm./l.) |
|---|---|---|
| $CoCl_2 \cdot 6H_2O$ | 5 | (5–50) |
| $NiCl_2 \cdot 6H_2O$ | 5 | (2–50) |
| $NaH_2PO_2 \cdot H_2O$ ("Hypo") | 15 | (5–50) |
| $NH_4Cl$ | 40 | (5–50) |
| Rochelle Salt | 25 | (0–100) |
| Citric Acid (add last) | 45 | (5–100) |

Other plating conditions

Temperature: 75° C. (65°–95°)
pH: 8.0 (7.0 to 9.5)
Plating time: Approximately 20 minutes (2–120 minutes)

To the above solution of Bath A about 20 gm./l. potassium hydroxide (KOH) is added, sufficient to stabilize pH at 8.0 (range about 10–40 grams per liter); preferably doing so only after the citric acid is present, since, otherwise, solubility problems may result. (For instance, KOH has been observed to precipitate cobalt where this order is not followed.)

TABLE I

The following properties of the resultant plated film are observed:

Magnetic properties

Coercive force: About 2.5 oe. (range is kept about 0.5–10 oe.)
Anisotropy field, $H_k$: 3 oe. (range about 2–15)
Flux density: 14 kg. (5–15 kg.)
Squareness: 0.7–0.98
Ni/Co ratio: 1.0 (2–0.2)

Mechanical properties

Thickness: About 0.75 micron (range 0.1–2.0)
Adhesion: Very good

The bath resulting from the foregoing ingredients has the following concentration of significant ions, as can be computed from the foregoing table using pure, e.g. 99% purity, ingredients:

| | Optimum (gm./l.) | Range (gm./l.) |
|---|---|---|
| $Co^{++}$ (cobalt) | 1.2 | 1.2–12.3 |
| $Ni^{++}$ (nickel) | 1.2 | 0.5–12.3 |
| $H_2PO_{-2}$ (hypophosphite) | 9.1 | 3.–30 |
| $NH_{-4}$ (ammonium) | 13.4 | 1.7–16.7 |
| $C_4H_4O_6^{--}$ (tartrate) | 13.0 | 0–52 |
| $C_6H_5O_7^{---}$ (citrate) | 40.1 | 4.5–90 |

It will be noted that the abovementioned preferred 1:3 ratio of cobalt chloride to hypo results in a concentration of cobalt ion to hypophosphite ion which is approximately 1:8.

Bath A above will be recognized by those skilled in the art to compirse a novel electrolyte. Its constituents and conditions may be varied somewhat as indicated above; however, holding in mind the purposes and limitations, indicated below in Table II:

TABLE II (1) It has been found, in general, that as pH increases (above the optimum) the flux also increases; while $H_c$ may vary depending on the solution. The maximum pH is determined according to the $H_c$ desired and also such as to avoid the possibility of decomposition; while a minimum pH is determined according to the minimum acceptable levels of flux and plating rate, according to the acceptable level of $pH_r$ (remanent flux), and such as to avoid non-uniform deposition.

(2) Increasing bath temperature decreases $H_c$ (due to increased plated thickness—i.e. it affects the plating rate and, thereby, the total flux which increases). For instance, a temperature increase of about 15 degrees C. increased the flux from two to three times. A temperature maximum will be observed such as to avoid decomposition; a minimum such as to maintain uniform plating and a minimum acceptable plating rate.

(3) Again, it has been found that flux varies directly with plating time, as does $H_c$ ($H_c$ decreases with plating time increase). A maximum plating time is determined according to the minimum acceptable transport speed (for the substrate); while a minimum plating time is observed according to the minimum acceptable flux. Varying the plating time will normally vary the total plated thickness of course.

(4) Flux and $H_c$ are independent of the concentration of Rochelle salt, though the indicated minimum is preferred to promote acceptable adhesion, while a maximum is observed consistent with acceptable costs.

(5) The concentration of nickel and cobalt source ions will be discussed below; however, in general, this should preferably be kept unusually low relative to hypo concentration. The indicated minima are observed to maintain an acceptable plating rate and to prevent the solution from changing too rapidly (being depleted); while the indicated maxima are determined by cost and the likelihood of decomposition.

(6) The nickel-to-cobalt ratio (Ni/Co in solution) however, does control magnetic flux, varying inversely with it. The Ni/Co ratio in the deposit varies directly with pH, while varying inversely with citric acid concentration, as noted below. Of course, this Ni/Co ratio in the deposit varies directly with the Ni/Co ratio in solution. The indicated extremes will be largely dictated by the magnetic properties desired, a maximum being observed to avoid the possibility of decomposition.

(7) Citric acid concentration has been found to vary directly with flux and inversely with the plating rate, while also affecting $H_c$. A minimum should be present to prevent precipitation (according to the amount of KOH also present, etc.); while a maximum will be determined by the minimum acceptable plating rate. Citric acid should be added last to avoid decomposition, as aforenoted. Exceeding about 40–45 g./l. concentration in this type electrolyte will also vary magnetic characteristics.

(8) Ammonium chloride ($NH_4Cl$) is used as a stabilizing agent. It also affects the plating rate (varies with it directly; not inversely, as with citric acid); having the opposite effect from citric acid and thus preferably compensating for it. Maximum concentration will be governed by cost considerations and the solubility limit; while a minimum determined according to the minimum acceptable plating rate (e.g. according to how much it has been degraded by adding the citric acid stabilizer).

(9) The concentration of "hypo" does not affect $H_c$ significantly (over a small range); however, increasing it does decrease the flux. The indicated minimum will be determined by the minimum acceptable plating rate; the maximum concentration by the maximum acceptable plating rate, as well as by the maximum acceptable amount of phosphorus in the deposit and by the possibility of decomposition.

However, as mentioned above, the most important factor determining the desired concentration of "hypo" is that it be kept high relative to that of cobalt and nickel, according to an aforementioned feature of the invention. I have found that this is best accomplished by establishing a certain pH (above 8.0) and by keeping the ratio of nickel, cobalt concentration to hypo concentration carefully controlled and low; such as at about: 1 to .3 or less (Ni, Co to Hypo; with Ni/Co ratio about 1.0).

It is significant that during plating the anisotropy of such plated films as aforedescribed is extremely sensitive to external magnetic fields (e.g. see below) and, thus, is much easier to control (e.g. as opposed to electroplated films typically requiring fussy annealing treatments for this). Hence, in addition to the foregoing plating techniques, and according to another feature of the invention, the substrate is also preferably oriented in the plating electrolyte in a particular manner so as to reduce a prescribed magnetic (switching) anisotropy ("Easy" direction), according to another feature of the invention. More particularly, we have found that, where a flat planar substrate is used for electroless plating such "soft" films as the aforementioned, disposing the substrate deposition surface in a "plating-plane" oriented in prescribed relation to "plumb" can affect (induce) anisotropy without need for the customary artificial magnetic fields. Indeed such fields must not be allowed near the substrate to derive this effect. Neither should the earth's magnetic field be interfered with. I have found it preferable with such Ni-Co films (e.g. plated according to the preferred example) to dispose this "plating-plane" at about 30° with respect to "plumb" (i.e. about 60° with respect to the azimuthal plane—the plane of the horizon). Of course, an infinity of such 30° planes is possible, lying along a 30° cone surface with a "plumb direction" axis, any one of which may be selected. I have found that "hard" (high coercivity; e.g. about 50 oe. or more) films are not subject to this effect however; nor, apparently, are electro-plated films. Workers in the art will appreciate the convenience of this teaching, allowing them to dispense with the conventional "anisotropy-field" coils for controllably inducing anisotropy in films of this type.

The magnetic characteristics of the plated film were tested on a 60 c.p.s. B.H. loop tracer with a maximum drive field of about 20 oe. Thickness was measured by cross-section. The chemical analyses of of the samples were made by first precipitating nickel and then plating the cobalt. Coercivity ($H_c$) will be, here, understood as that field (or magnetizing force H) required to reduce the magnetic flux density (or induction B) to zero in "Easy" direction.

Of course, it should also be borne in mind that if certain electrolyte ingredients and plating parameters are varied, the result will be a corresponding change in magnetic characteristics, especially in coercivity, as clearly detailed in the aforementioned U.S. patent application, Ser. No. 582,090. For instance, with a prescribed concentration of cobalt-chloride, varying the Ni/Co source ion concentration will correspondingly change the coercivity of the plated film, while changes in the cobalt-chloride concentration will give a similar effect (other plating and electrolyte parameters being kept constant, of course). The use of potassium hydroxide (KOH) was found particularly important for deriving this relation; for instance, no such coercivity control being possible when using ammonium hydroxide to control pH instead. ($NH_4OH$ also vaporizes, typically, to an extent that makes a bath unstable, requiring frequent adjustment.) Coercivity was also found to be controllable according to the ammonium chloride concentration as well as according to the concentration of citric acid.

It is significant to note that citric acid concentration may be varied to control coercivity somewhat in the manner of the foregoing parameters of bath pH or concentration of ammonium chloride; remembering, however, that it varies inversely with the plating rate (i.e. increasing citric acid concentration was observed to decrease the plating rate, where the other parameters increased it). One advantage to the indicated control of coercivity by citric acid content is that, being the opposite of the control provided by the other parameters, it may advantageously be combined with them, for instance, to help "equilibrize" an electrolyte to particular operating conditions (e.g. zero-in on specified plating rate and compensating for "coercivity-overshoot" etc. resulting from the contributions of the other parameters). Varying concentration of citric acid also has an effect upon the magnetic flux output of the plated film, the flux varying continuously and inversely therewith. This is believed mainly due to a decrease in plating rate, since it was noticed that the deposit grew thinner with increasing citric acid concentration.

A high degree of coercivity control may be achieved using one or more of these parameters as the control agent. Also, a plating operation may be performed at the optimum, most inexpensive, convenient, etc. operating point by combining the effects of these parameters. Further, a continuous control over such plating may be readily achieved, for instance, such as to plate magnetic films of a constant coercivity value—a feat heretofore quite difficult. Ferrous ammonium sulfate may also be added as a stabilizer etc. as taught in aforementioned application (582,090). However, the "coercivity-transition control" there described will not be expected here, e.g. because a much lower $H_c$ region is used here. The present invention is more apt for plating relatively "soft" films (e.g. below 20–50 oe.).

It will be appreciated, in light of the foregoing, that the invention teaches the art novel techniques for plating soft magnetic Ni-Co type films and doing so with better anisotropy control (greater squareness-change, Easy to Hard—e.g. to below about 0.1 $B_r/B_s$ in Hard direction); as well as how to "gravitationally-orient" such films (anisotropy) conveniently. A salient characteristic of plating baths according to this invention is their relatively high concentrations of citric acid and ammonium chloride (increasing stability without degrading plating rate); as well as their relatively low concentration of nickel, cobalt source materials (relative to "hypo" concentration).

Further, the films of the invention are found to have surprisingly good adhesion to a smooth glass substrate; though, of course, they will have even better adhesive to metallic substrates. Excellent control over thickness and uniformity of magnetic readout flux is also obtained. Furthermore, and surprisingly, there is no apparent degradation of other related properties (no "trade-off" required) using the modified electrolyte of the invention and the associated plating methods. Workers in the art will recognize other equivalent applications whereby magnetic films are electroless plated in the claimed manner for improved control over a prescribed (pronounced) anisotropy characteristic, a high $H_c/H_k$ ratio and the like, and moreover, a gravitationally-induced control over intrinsic anisotropy like that indicated is employed.

From the foregoing description, it will be manifest that I have taught those skilled in the art how to electroless plate soft magnetic films, like the foregoing, employing improved electrolytes and associated methods. It will also be apparent that the techniques of the novel plating process described have application in different, related, plating environments (e.g. for plating magnetic cylinders, cores, etc.) other than those of the foregoing embodiments. Similarly, such "soft" magnetic films might be otherwise electroless plated by analogous techniques. Thus, other applications for the invention will be evident to those skilled in the art and the invention should not be confined to the exemplary applications described. In short, while the invention has been particularly shown and described with reference to these preferred, embodiments, it will be understood that various changes in form and details, in constituents and steps, in concentrations and in ranges may be made without detracting from the spirit and scope of subject claims.

What is claimed is:

1. An alkaline electrolyte for electroless deposition of a magnetic information-storing nickel-cobalt-phosphorus alloy layer on a non-magnetic substrate, said electrolyte being characterized in that it (A) provides said layer with anisotropic magnetic properties including a low easy axis magnetic coercivity $H_c$ in the range of about 0.5 to 10 oersteds, and a hard axis saturation field $H_k$ only slightly larger than said easy axis coercivity and in the range of about 2 to 15 oersteds, (B) consists essentially of (1) cobalt chloride hexahydrate in a concentration of about five grams per liter, (2) nickel chloride hexahydrate in a concentration of about five grams per liter, (3) sodium hypophosphite in a concentration of about fifteen grams per liter so as to be present in a concentration substantially three times said concentration of cobalt chloride, (4) ammonium chloride in a concentration of about forty grams per liter, and (5) citrate ions in a concentration of about forty grams per liter, and (C) has a pH between about seven and nine and a half.

2. An electrolyte as defined in claim 1 further characterized in that it includes Rochelle salt in a concentration of about twenty-five grams per liter.

3. An electrolyte as defined in claim 1 further comprising potassium hydroxide in a concentration of about 10 to 40 grams per liter.

4. An electrolyte as defined in claim 1 further comprising potassium hydroxide in an amount to provide said value of pH.

5. A process of preparing a magnetic record medium having a magnetic alloy film of nickel and cobalt and phosphorous on a non-magnetic substrate, said process (A) providing said layer with a thickness of about 0.1 to 2 microns and with anisotropic magnetic properties including a low easy axis magnetic coercivity $H_c$ of about 0.5 to 10 oersteds, and a hard axis saturation field $H_k$ only slightly larger than said easy axis coercivity and of about 2 to 15 oersteds, and (B) comprising the steps of (1) preparaing an alkaline electrolyte for the electroless plating of said film, with said electrolyte consisting essentially of cobalt chloride hexahydrate in a concentration of about five grams per liter, nickel chloride hexahydrate in a concentration of about five grams per liter, sodium hypophosphite in a concentration of about fifteen grams per liter so as to be present in a concentration substantially three times said concentration of cobalt chloride, ammonium chloride in a concentration of about forty grams per liter, and citrate ions in a concentration of about forty grams per liter, and having a pH between about seven and nine and a half, and (2) electrolessly plating said thickness of said film onto said substrate from said electrolyte, with said electrolyte being at a temperature of between about 65 and 95 degrees centigrade.

6. A process as defined in claim 5 further characterized in that said electrolyte preparing steps include providing Rochelle salt in the electrolyte in a concentration of about twenty-five grams per liter.

7. A process as defined in claim 5 in which said electrolyte preparing step includes providing said electrolyte with potassium hydroxide in a concentration of 10 to 40 grams per liter.

8. A process as defined in claim 5 in which said electrolyte preparing step includes introducing potassium hydroxide to said electrolyte to provide it with said value of pH.

9. A process as defined in claim 5 further comprising the step of orienting said substrate with the direction of easy magnetization desired for said layer being angled 30° from the vertical, and subjecting said substrate to the magnetic field of the earth during said plating step while in said orientation.

References Cited

UNITED STATES PATENTS

| | | | |
|---|---|---|---|
| 3,138,479 | 6/1964 | Foley | 117—236 |
| 3,268,353 | 8/1966 | Melillo | 117—236 |
| 3,416,955 | 12/1968 | Makowski | 117—130 X |
| 3,423,214 | 1/1969 | Koretzky | 117—130 X |

WILLIAM D. MARTIN, Primary Examiner

B. D. PIANALTO, Assistant Examiner

U.S. Cl. X.R.

106—1; 117—130, 160, 240